United States Patent Office 3,094,638
Patented June 18, 1963

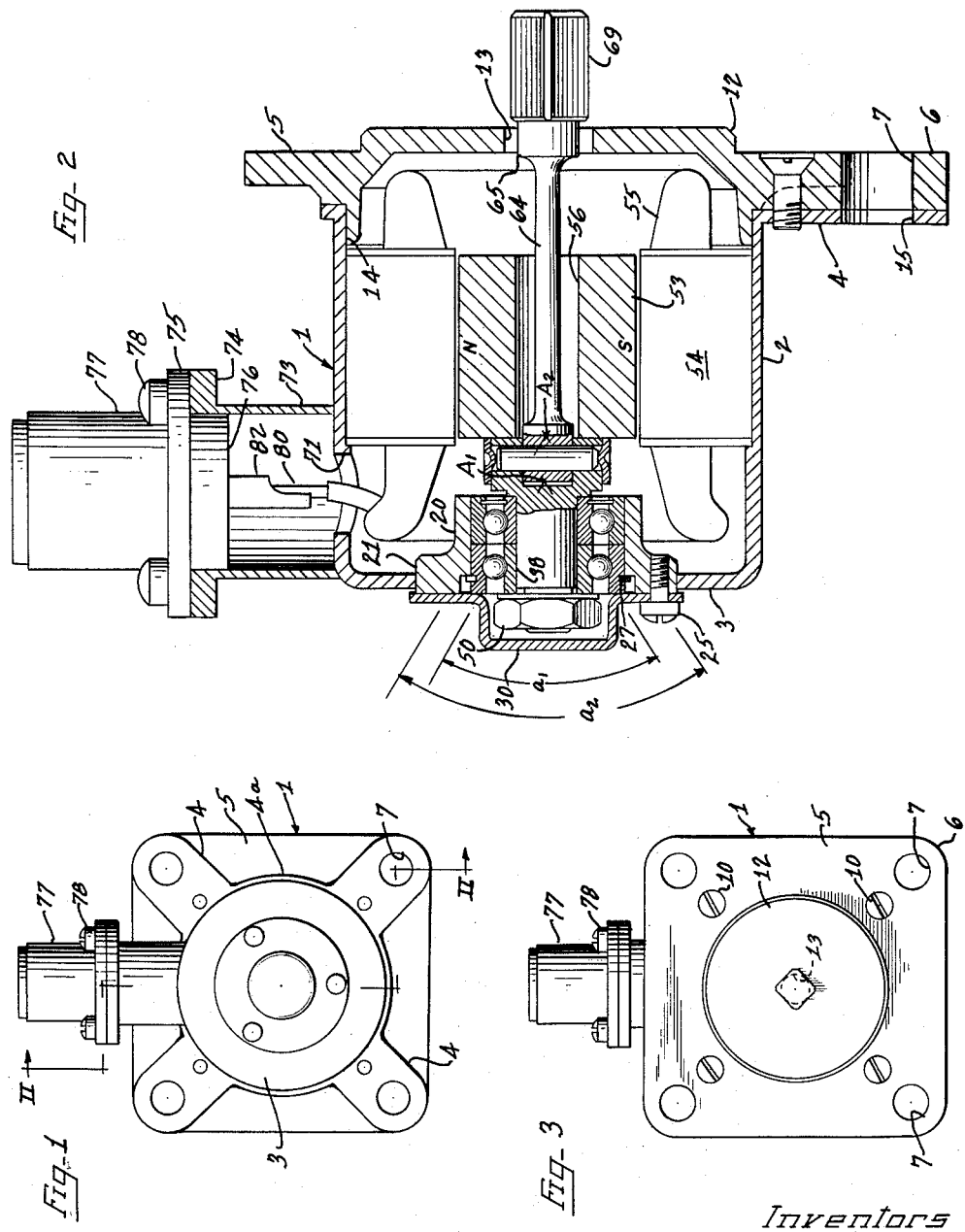

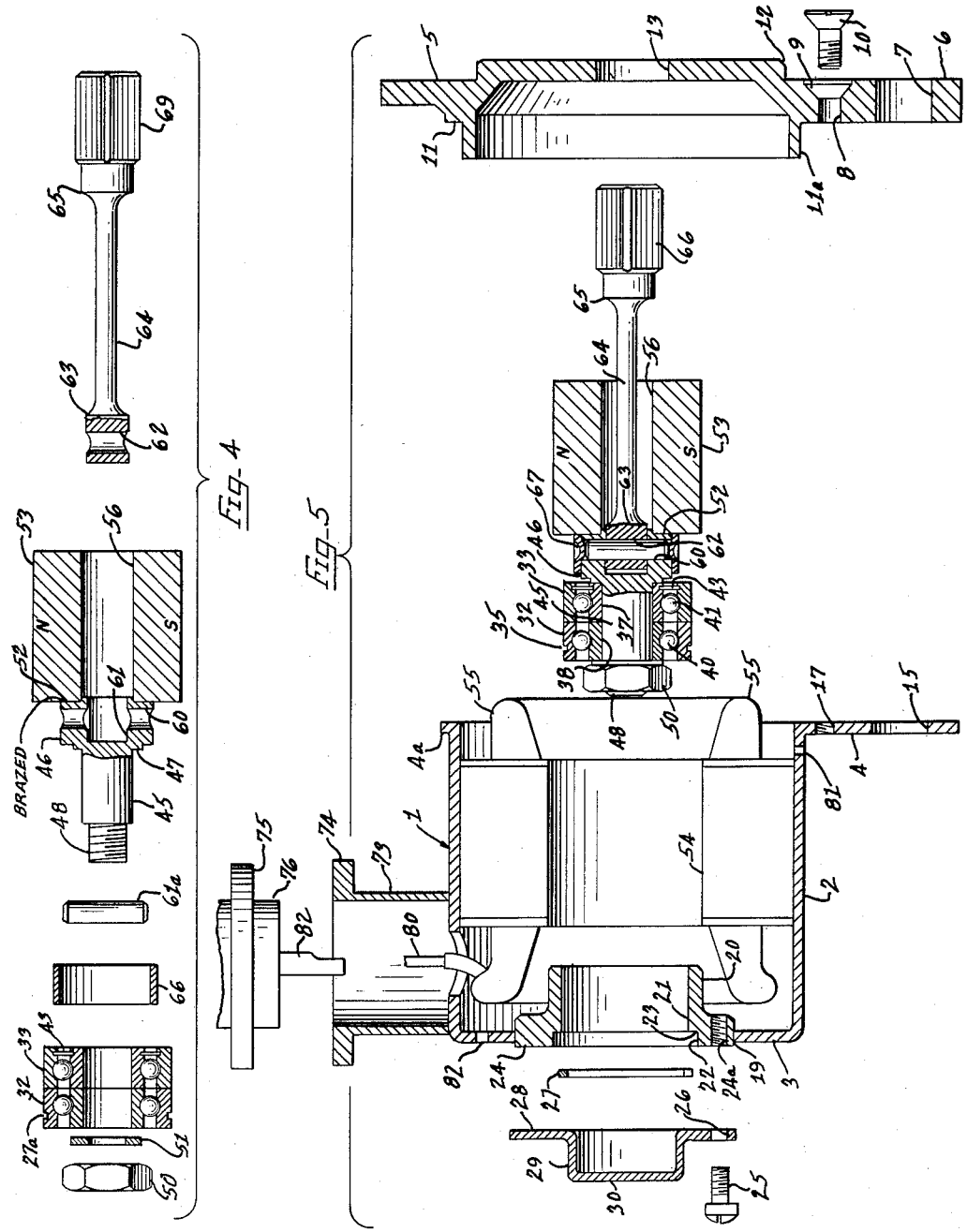

3,094,638
EXTERNALLY MOUNTED, DIRECT DRIVEN ROTARY UNITS FOR PRIME MOVERS
Harold H. Humpal, Santa Ana, Calif., and Hiroo Kitaoka, Euclid, Ohio, assignors to Thompson Ramo Wooldridge Inc., Cleveland, Ohio, a corporation of Ohio
Filed June 1, 1960, Ser. No. 33,252
10 Claims. (Cl. 310—75)

This invention relates to a prime mover driven and externally mounted unit, such as a tachometer generator. More particularly, this invention relates to simplified, miniaturized and high temperature resistant types of externally mounted and engine driven, rotary devices including tachometer generators, preferably of the stator permanent magnet type and for use in various aircraft and industrial engine or prime mover applications.

It is a general object of this invention to provide a reliable but miniaturized, direct driven, rotary unit to be mounted externally on prime movers and preferably having dual utility parts.

Other objects of this invention reside in the provision of such rotary units, and particularly tachometer generators, which are resistant to relatively high operating temperatures and which also are versatile and can be used in a large number of different applications including both vertical and horiontal installations.

Still other objects hereof are to be found in the supplying of such units having a flexible or quill-type driving connection for misalignment and to limit bearing loads and whose coupling area or driving pin can be enlarged independently of the rotor or bearing and in which the rotor furnishes an oil flinger between the open mounting and the outboard, packed bearing.

A further object hereof is the provision of such a unit wherein both an inner or flange bearing and an inner or flange oil seal are eliminated in a practical fashion.

Additional objects of this invention are given by the provision of such rotary units or generators whose outboard bearing, preferably of the double row ball bearing unit type, is of the smallest possible and practical size, is connected directly to the quill driven rotor, whose size is independent of the quill diameter and which has the apex of its bearing angle or angles near or very close to the location of the quill coupling point to give the operational equivalent of a two bearing, simply supported shaft.

Further objects hereof reside in the provision of such a unit wherein the outboard, sealed and lubrication packed bearing is readily accessible for relubrication without disturbing or removing the rest of the unit.

Other objects, advantages, and features hereof will become apparent from the following detailed description of one exemplary embodiment of this invention taken in connection with the accompanying drawings in which:

FIGURE 1 is an elevational view of the outer end of a tachometer generator unit according to the present invention;

FIGURE 2 is an enlarged sectional view taken along lines II—II of FIGURE 1, with portions in the interior unsectioned for the sake of clarity;

FIGURE 3 is an elevational view of the inner end of the same unit;

FIGURE 4 is an exploded or disassembled view of the several parts of the rotor and shaft and bearing assembly taken mostly in an axial section; and FIGURE 5 is an exploded or disassembled view of the several parts of the whole unit, taken mostly in an axial section.

In the one exemplary embodiment shown in these FIGURES 1 through 5, inclusive, the tachometer generator unit of this invention is designated as a whole by 1. It is enclosed in an outer and cylindrical casing 2, preferably of steel or of suitable light metal or alloys thereof. This casing has the preferably integral, or outer end portion 3 which is closed except for the axial outer opening 19.

The inner end of casing 2 is preferably integrally flanged outwardly as shown at 4a and also by the extended or radially elongated corner portions 4. A heavier or thicker rear closure 5 for the casing 2 is preferably generally rectangular in shape or, as shown, square with rounded corners 6 having suitable bolt holes 7 in these corners. This rear closure 5 has the central, circular, back extension 12 having the axially or centrally located opening 13 therein which is preferably rectangular with rounded corners as shown. This member 5 also has the inner four bolt holes 8 having rear or inward countersunk portions 9 shaped to receive the machine screws 10 as shown.

The outer face of this rear closure includes the integral and outwardly extending reduced diameter extension 11a to be received, with a neat fit, in the inner end of the cylindrical casing portion 2 with the inner end of casing 2 abutting against the shoulder 11 of the rear closure 5.

This rear closure 5 is secured in place in any suitable or convenient manner, as by the machine screws 10 engaging in the correspondingly threaded holes 17 in the corner members 4 of casing 2. It is to be understood that suitable bolts or machine screws (not illustrated) are secured in holes 7 to mount the whole unit in place on a mounting pad or flap having correspondingly spaced holes, all as will be understood by those skilled in this art. This last also helps hold rear closure 5 on case 2.

In this connection it will be understood that the prime mover or engine will have, centrally of its pad and securing holes, a hole or opening through its outer walls and to match up with opening 13 to permit the insertion of coupling member 69, which is to be received in a correspondingly shaped, female socket in the end of a suitably driven shaft or the like, which may be driven at engine speed or any suitable, geared ratio thereto. It will be understood that the opening through the prime mover or engine side walls may be of the same size as opening 13 or larger. In this connection it is to be noted that there is no seal at or adjacent to 13, nor is one needed as will be hereinafter explained.

Suitably secured in the opening 19 of the casing in its front wall 3 is the generally cylindrical bearing holding member 20, having a hollow cylindrical portion 21 extending axially therethrough and communicating with the enlarged cylindrical portion 22 with the outwardly facing or flat wall 23 therebetween.

Member 20 has an outer end enlarged portion or flange 24 with threaded holes 24a therethrough. These holes 24, which are here illustrated as being three in number, are adapted to receive the correspondingly threaded screws 25 which extend through holes 26 in the side flanges 28 of the end cover having the cylindrical portion 29 and the outer end face 30, as shown.

The retaining snap ring 27 abuts against the wall 23, and is adapted to be snapped into, and held in, a correspondingly shaped ring groove in the outer race 32 of the axially outer bearing of the dual row bearing set, after the bearing has been pushed through cylindrical opening 21 from the inside.

While it will be understood that various known and desirable types of bearings may be employed within the purview of this invention, yet in this exemplary embodiment, the preferred bearing unit is a unit comprising two closely adjacent ball bearings to form a double row ball bearing unit, which may be of various suitable types so that its exact assembly details or features such as its ball cages, are not illustrated herein since they are well known to those skilled in this art.

The outer row bearing includes the balls 40 and the inner rotatable member 38 while the axially inner bearing of this unit has the outer, stator member 33, the balls 41 and the inner rotatable member 37.

As shown, the inner end of this two row bearing unit is suitably sealed to prevent loss of its grease packing as by the seal member 43.

It will be understood that inner portions 38 and 37 are mounted on, and fixed to, the axially outward, bearing shaft extension 45, and held clamped thereon through the washer 51 and the nut 50 which is threaded onto the correspondingly threaded end 48 of the shaft extension. As shown, the axially inner end of this bearing set is held in abutment against the step or wall 47 which is slightly axially outward from the enlarged, and preferably cylindrical portion 46.

The coupling pin receiving opening 60 extends transversely through the enlarged portion 46 and is closely adjacent to the magnet rotor unit 53 which has its axially outer end suitably secured to the enlarged portion 46. More specifically, we prefer to have the radially inner portions of the axially outer end of the magnet rotor 53 secured to the inner axial end 52 of the enlarged portion 46 by brazing as indicated by the legend in FIGURE 4.

It will be noted that the magnet rotor 53 has a central hollow cylindrical portion 56 which is of an adequate size to receive the enlarged outer end 63 of the quill member 64. It will be noted that this opening 56 is slightly larger in diameter than the corresponding and aligned opening 61 in the enlarged portion 46. This opening 61 transversely intersects the transverse pin receiving hole 60.

Thus when the enlarged outer end 63 of the quill (having the intermediate portion 64) is assembled, its opening 62 is aligned with opening 60 to receive the pin 61a therethrough. This pin forms a pivotal mounting, or the flexible coupling, between the outer end of the quill and the rotor unit. This pin 61a is retained in place by any suitable or conventional means such as the retaining ring 66 pressed over the enlarged portion 46 and having its depressed portion 67 preventing its removal and holding the pin 61a in place.

The middle portion 64 of the quill enlarges smoothly by a suitable fillet or radius into the cylindrical portion 65 which, in turn, is integral with the inwardly extending coupling member 69. This part 69 is preferably of a non-rotatable shape such as the cross shape shown.

As indicated in FIGURES 2 and 5, the stator assembly is a unit including the poles 54 and the coils 55. It is suitably secured in the cylindrical shell 2. Suitable wires extend from the coils 55 as shown at 80. These wires are connected into portion 82 and extend outwardly through opening 71 leading into the extension housing 73 which has the enlarged or flanged outer portion 74, to which is secured a corresponding housing portion 77 having a similar and matching flange 75, these two flanges being secured together as by the screw 78. Reduced portion 76 of 77 is received in 75. It will be understood that the wires 80 of this tachometer generator are connected to a suitable r.p.m. indicator in conventional fashion.

As shown in FIGURE 2 the outer row of balls 40 have, with inner and outer bearing portions 38 and 32, respectively, the bearing contact angle or cone $a_1$ as shown by its apex $A_1$ lying very close to, and preferably slightly on the outer side of, the center of the transverse coupling or pivot pin $61_a$. In similar fashion, the inner row of balls 41 have a bearing contact angle or cone $a_2$ having the apex $A_2$ lying very close to, and preferably slightly and to an equal distant on the inner side of, the axis of the coupling pin $61_a$. Preferably, the two row units of this ball bearing unit are quite close together so that their apexes $A_1$ and $A_2$ will be close together for the case of the preferred identical contact angles as illustrated. It will be noted that, as a practical matter, the single bearing unit comprising the two rows of balls 40 and 41 may be considered as having its one (or its combined) contact angle or cone with an apex lying on or very close to the axis of the coupling pin $61_a$. This is an important feature in an externally mounted and direct driven rotary unit of the present type in that it gives an assembly acting as a simply supported two bearing shaft.

Thus the location of the quill coupling point with respect to the apex of the bearing contact angle cone also cooperates with the present outboard bearing design since it permits the smallest possible double row bearing (particularly as to its short axial length) which is coupled directly to the rotor. Thus the rotor is positively located as well as rotatably mounted, with respect to the outer end of the casing 2.

It will be noted that the rotor as a whole and particularly its enlarged inner magnet portion 53, forms a natural and efficient oil slinger to prevent engine oil leaks from purging the packed grease in the bearings for the balls 40 and 41. This prevents lubrication oil entering the casing 2 from the engine through the opening 13 from acting against the seal 43 tending to wash out the packing grease for the balls 40 and 41.

It will also be noted that this design completely eliminates the usually troublesome flange bearing and substitutes therefor the desirably small size and outer double row bearing coupled directly to the rotor.

It will be appreciated that the bearing size is independent of the quill diameter in our invention.

Periodic greasing or regreasing can be accomplished very simply and without total disassembly or removal of this unit. This greasing may be done by simply removing the outer end cover 30 giving access to the ball bearings 40, 41 so that they may be repacked with grease.

In accordance with the present invention, the housing 2 and the bearing assembly are preferably made of materials having similar or substantially identical coefficients of thermal expansion thus permitting operation of the unit as a whole over a wide range of temperatures without distortion affecting bearing performance. It will be noted that axial loads due to thermal expansion of the shaft and housing are thus eliminated.

It will be seen that bearing loads are limited, or are materially reduced, by the flexural action of the quill and its pivotal connection. Further, the quill coupling area (which is closely adjacent to the double row bearing) can be enlarged materially to allow sufficiently large drive pins for any practical purpose. It will be noted that a larger coupling pin may be employed in the present design if desired.

It will also be noted that the casing has oil drain holes such as 81 on its side to drain oil when the casing or unit is mounted in horizontal position and the similar drain hole 82 in its end to drain out excess oil when the unit is mounted in a downwardly extending and vertical position. These drain holes are to get rid of slight amounts of engine oil spray or the like which may enter casing 2 through the opening 13 and cooperate in providing a design in which no positive flange oil seal is required since such small amounts of engine lubricating oil as may enter the casing through the opening 13 are removed by the drain openings 81 or 82 and thus prevent it from purging or washing out the grease packing for the bearing unit 40, 41.

It is also to be noted that the principles of the present invention including the entire or sole locating of the rotor unit( of any type) by the outboard and minimum size ball bearing unit is particularly useful in the miniaturization of auxiliary units to be mounted on prime movers whether they be tachometer generators or other auxiliary units to be mounted, and directly driven by, an engine, turbine, or other type of prime mover. In this connection the simplicity of design of the present invention, the small size of its bearing unit, its ability to operate over a wide range of temperatures, and the operation of its outboard bearing as though it were a simply supported two bearing shaft, all cooperate to provide a device of minimum size and weight having simplicity of design and hence a high degree of dependability as well as ease of service.

As noted above, other types of direct driven auxiliary units are intended to be embraced within the teachings of this invention and the appended claims.

It is also to be understood that various changes or modifications may be made within the teachings of this invention without departing from the spirit and scope of the novel concepts hereof.

We claim as our invention:

1. A rotary unit to be mounted on the outside of, and to be directly driven by, a prime mover comprising a unit casing having an inner end mounting means and a driving opening therethrough, said casing also having an axially outer end, an axially elongated bearing unit secured therein, a rotor unit comprising an inner and axially hollow rotor and an outer and rigidly connected shaft extension rotatably supported against tilting and located by said axially elongated bearing unit, and rotor unit driving means pivotally connected to said shaft extension of said rotor and extending through said hollow rotor unit and through said driving opening.

2. A rotary auxiliary unit to be mounted on the outside of, and to be directly driven by, a prime mover comprising a casing having an inner end mounting means and a driving opening therethrough, said casing also having an axially outer end, a sealed and grease packed double row ball bearing unit secured therein, a rotor unit comprising an inner and axially hollow rotor and a closely adjacent outer and rigidly connected shaft extension rotatably supported in, and located axially and laterally only by, said double row bearing unit, and a rotor unit driving quill flexibly connected to said shaft extension of said rotor unit by a transversely extending pivot located closely adjacent to said bearing and between said bearing and said hollow rotor, said quill extending inward through said hollow rotor and through said driving opening and having a non-rotatable driving coupling means at the inner end thereof.

3. A directly driven rotary unit to be removably mounted on a prime mover comprising a casing having an axially open inner end with mounting means thereon and an axially outer end, a bearing unit of the rolling element contact type having a contact angle cone with an apex, a rotor unit in said casing mounted in, and located by, said bearing unit and having a driving means extending through the open inner end of said casing and suitably connected at its outer end to said rotor unit close to said apex, said bearing unit being located at said axially outer end and being the only bearing and locating means for said rotor unit.

4. A direct driven rotary unit to be mounted on a prime mover comprising a casing having an axially open inner end with mounting means thereon and an axially outer end, a bearing unit comprising two closely adjacent rows of ball bearings having a substantially common contact angle cone with an apex, a rotor unit in said casing and having an inwardly extending central hollow, said rotor unit being mounted in, and located both axially and laterally entirely by, said bearing unit, and a driving quill extending in through said hollow and through the open inner end of said casing and being suitably connected at its outer end to said rotor unit by a transversely extending pivot located close to said apex, said bearing unit being located at said axially outer end and being the only bearing and support for said rotor unit.

5. A rotary unit to be directly driven by, and mounted on, a prime mover extending axially therefrom comprising an axially extending casing having an inner end open at least at its central portion and including mounting means, said casing having an axially outer end with an opening extending therethrough, a rolling element contact type bearing unit secured in said outer opening, a prime mover driven rotor unit with an axial extension part rotatable in and located entirely by, said bearing unit, driving means connected to said axial extension part of said rotor unit and extending inwardly through said inner end opening, said bearing unit including an inner seal to retain packed grease therein and a removable outer cap giving access thereto for repacking with grease without removal or other disassembly of said rotary unit.

6. A direct driven rotary unit to be mounted on a prime mover comprising a casing having an axially open inner end with mounting means thereon and an axially outer end, a single axially elongated bearing and locating unit mounted in said axially outer end, a rotor unit rotatable in, held against tilting by and located entirely by said single axially elongated bearing unit, drive means flexibly connected to at least a part of said rotor unit, said casing, said bearing unit, and said rotary unit being of materials having substantially the same coefficient of thermal expansion to permit said rotary unit to operate through a wide temperature range.

7. A rotary unit to be mounted on, and directly driven by, a prime mover comprising an axially extending casing having an axially inner end with a central opening and mounting means, said casing having an axially outer end, a bearing unit of the rolling contact element type mounted in said axially outer end, an inwardly extending rotor in said casing and rotatably mounted in said bearing unit, said bearing unit having an inner seal and outer grease retaining means to retain grease packed therein, a rotor unit in said casing and rotatably mounted in said bearing unit, driving shaft means connected to said rotor unit and extending inwardly through said casing inner end opening to be driven by said prime mover, said opening providing an open and unsealed access for the lubricating oil of said prime mover into said casing, said rotor unit being of larger diameter than said driving shaft means and extending close to said inner end opening to act as an oil slinger to fling entering engine lubricating oil radially outward and prevent its reaching said grease packed bearing unit, said bearing unit at said axially outer end being the only bearing or locating support for said rotor unit.

8. A tachometer generator adapted to be mounted on, and directly driven by, a prime mover, said generator comprising an axially extending casing having an axially outer end with a double row ball bearing unit mounted therein, a stator including poles and coil means secured in said casing, a hollow magnetic rotor unit in, and coaxial with, said stator and having an axially and outwardly extending shaft extension rotatable in, supported and located only by, said bearing unit, and inwardly extending driving means extending through said hollow rotor unit and flexibly connected to said shaft extension of said hollow rotor unit adjacent to said bearing unit, said bearing unit at said axially outer end being the only bearing or locating support for said rotor unit.

9. A tachometer generator to be mounted on, and driven by, a prime mover comprising an axially outwardly extending casing having an open inner end with mounting means thereon, said casing having an axially outer end, a bearing unit therein, a hollow stator including coil and pole means secured in said casing, a cooperating rotor in said stator and having an axially outward extension rotatably mounted in said bearing unit, a driving shaft means of smaller diameter than said rotor and connected thereto, extending inwardly through said axially inner opening to permit engine lubricating oil to enter said casing, said larger diameter rotor acting as an oil slinger to prevent entering prime mover lubricating oil from substantially reaching said outer bearing unit, said casing having oil drainage opening means therein.

10. A tachometer generator unit adapted to be mounted on the exterior and directly driven by, a prime mover comprising a generally cylindrical and axially and outwardly extending casing having an axially open inner end with mounting means thereon, said casing having an axially outer end, a rolling element contact type bearing unit secured in said axially outer end, a hollow external stator including coils and poles secured in said casing, a cooperating rotor in said stator having an axially outwardly extending extension rotatably mounted in said bearing unit and located thereby, said rotor having a centrally located and axially extending hollow extending outwardly from its inner end, a driving quill extending inwardly through the open inner end of said casing and axially through said rotor hollow, and flexible connecting means at the axially outer end of said quill connecting it to said rotor unit.

References Cited in the file of this patent

UNITED STATES PATENTS

| | | |
|---|---|---|
| 1,714,484 | Johnson | May 21, 1929 |
| 2,437,954 | Havill | Mar. 16, 1948 |
| 2,658,361 | Kalikow | Nov. 10, 1956 |
| 2,772,546 | Barrows | Dec. 4, 1956 |
| 2,846,600 | Potter | Aug. 5, 1958 |